Figure 1:
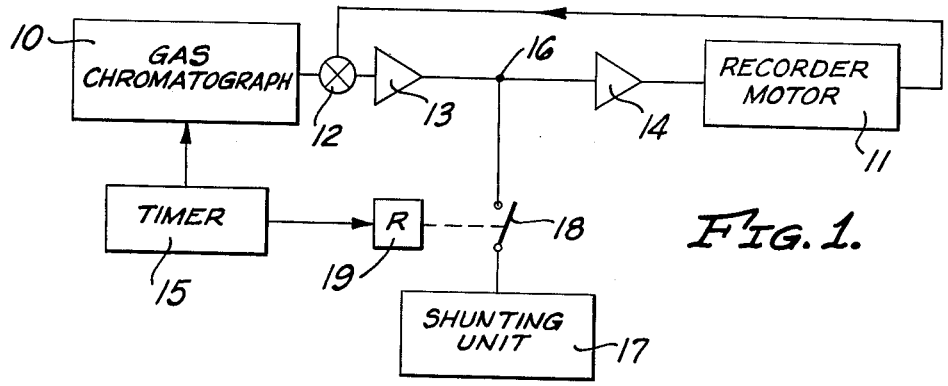

Oct. 12, 1965    J. C. DAVIS ETAL    3,211,980
SIGNAL PEAK CONTROL CIRCUIT
Filed June 8, 1962

SHUNTING SWITCH OPEN           SHUNTING SWITCH CLOSED

INVENTORS
JAMES C. DAVIS,
KENNETH B. SAWA
BY THEIR ATTORNEYS
HARRIS, KIECH, RUSSELL & KERN

United States Patent Office 3,211,980
Patented Oct. 12, 1965

3,211,980
SIGNAL PEAK CONTROL CIRCUIT
James C. Davis, Fullerton, and Kenneth B. Sawa, Buena Park, Calif., assignors to Beckman Instruments, Inc., a corporation of California
Filed June 8, 1962, Ser. No. 201,134
5 Claims. (Cl. 318—207)

This invention relates to data recording and control circuitry suitable for use with chromotagraphic analyzers and the like and, in particular, to a signal peak control circuit suitable for determining the occurrence of the maximum value of signal peaks and controlling the operation of recorders or other output devices. Typically, the circuit may be used to control a recorder for holding the recorder at the maximum value of a peak or peaks in an analyzer output. It may also be used for controlling valves, voltage supplies, and other control apparatus. This maximum value indication may be used to simplify chart reading or may be used for subsequent control operations as desired. The invention will be described herein as used in conjunction with a gas chromatograph and a recorder.

A gas chromatograph produces an output in the form of a train of signal peaks for each sample introduced into the instrument, with the time of occurrence of a peak identifying the particular component of the sample which produces the peak and with the magnitude of the peak constituting a measure of the quantity of the particular component present in the sample.

In process monitoring, a sample will be introduced into the analyzer periodically resulting in an output in the form of a cyclical train of signal peaks, with the change in maximum value of a particular peak in each successive train indicating the trend of a particular constituent of the sample being analyzed. The output of the conventional analyzer will be a chart having many peaks thereon with variable spacing between the peaks. In order to eliminate a large quantity of undesired data, trend recorders have been developed which produce a record indicating only the change in maximum value of a particular peak or peaks of the train. A conventional analyzer chart and several typical trend recorders are shown in U.S. Patent No. 2,899,258.

In a typical trend recorder, the maximum value of a signal peak is determined and a record of this maximum value is made, as by making an impression on the record chart. It is an object of the present invention to provide a new and improved apparatus in which the occurrence of the maximum value of a signal peak is recognized and the recorder or other output device is maintained at this maximum value for a significant period of time so as to produce a record having an emphasized maximum value for each signal peak of interest.

It is also an object of the invention to provide a new and improved signal peak control circuit which is relatively insensitive to noise in the analyzer output. A further object is to provide such a control circuit which is simple, reliable and inexpensive.

It is an object of the invention to provide a signal peak control circuit for operation in conjunction with a recorder servo or similar instrument with the control circuit permitting the servo to follow the input signal as it increases in magnitude while blocking servo operation when the input signal reaches a maximum value and begins to decrease. A particular object is to provide such a circuit for use with a phase sensitive servo with the control circuit permitting signals of one phase to be utilized while blocking operation with signals of the opposite phase.

It is an object of the invention to provide a new and improved signal peak control circuit for operation with a chromatographic analyzer or the like which produces an output in the form of a train of signal peaks, including an output servo for actuating a recorder or the like as a function of the analyzer output, the servo having a reversible drive unit moving as a function of the phase of the driving signal connected thereto, and a driving circuit producing a driving signal varying in phase as a function of the slope of a signal peak, with the control further including means for connecting an input terminal to circuit ground through alternate unidirectional conducting paths of opposing polarities and in phase with the signal of the driving circuit, and means for connecting the signal of the driving circuit to the input terminal for shunting signals of one phase and blocking movement of the drive unit in one direction.

It is a further object of the invention to provide such a control circuit including an output servo for actuating a recorder or the like as a function of the analyzer output, a switching circuit for connecting an input terminal to circuit ground through alternate unidirectional conducting paths of opposing polarities, means for driving the switching circuit in phase with the A.C. signal of a motor driving circuit, and means for connecting the A.C. signal of the motor driving circuit to the input terminal of the switching circuit, with the output servo including a phase sensitive motor and a motor driving circuit producing an A.C. output signal to the motor varying in phase as a function of the slope of a signal peak.

Further objects, features, advantages and results of the invention will more fully appear in the course of the following description. The drawing merely shows and the description merely describes a preferred embodiment of the present invention which is given by way of illustration or example.

Figure 2:
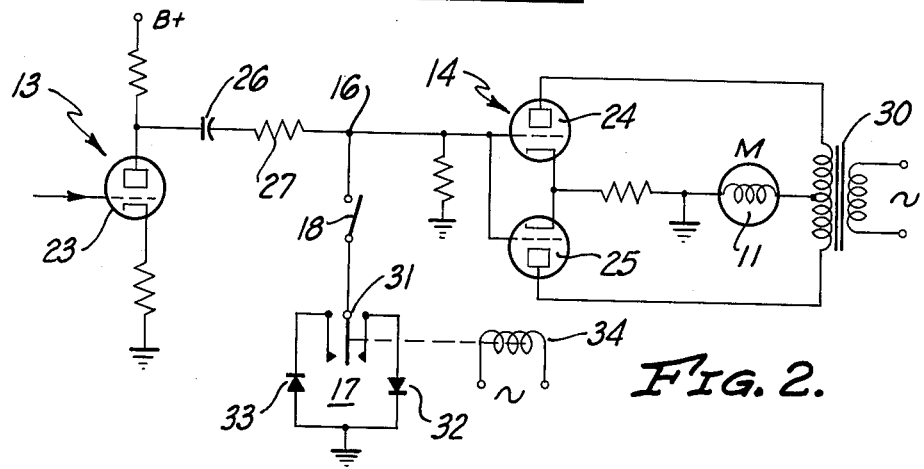
Figure 3A:
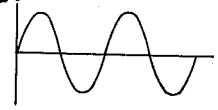
Figure 3C:
Figure 3B:
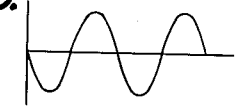
Figure 3D:
Figure 4:
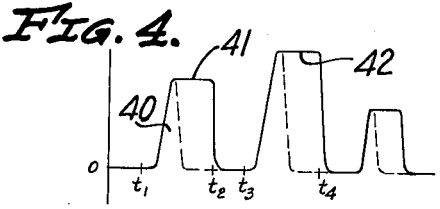

In the drawing:
FIG. 1 is a block diagram illustrating a preferred embodiment of the control circuit of the invention in combination with a gas chromatograph;
FIG. 2 is a circuit diagram showing the control circuit of FIG. 1;
FIGS. 3a, 3b, 3c, and 3d illustrate various signal waveforms in the operation of the control circuit; and
FIG. 4 is a typical plot of the recorder output when operated in conjunction with the control circuit of the invention.

Referring to the equipment of FIG. 1, the signal from a gas chromatograph 10 is combined with the position feedback signal from an output device, such as a recorder motor 11, at a mixing point 12 to provide an error signal for amplifiers 13, 14 which drive the recorder motor. The chromatograph may be controlled by a timer 15, such as the motor and cam-operated switches of the aforesaid U.S. patent, for controlling the introduction of samples into the analyzer and for connecting selected signal peaks of the output to the recorder servo.

In the signal peak control circuit illustrated, a point in the servo loop, here the point 16 between the amplifiers 13, 14, is connected to a shunting unit 17 through a switch 18. The switch 18 may be actuated by a relay 19 under the control of the timer 15. The unit 17 functions to block signals of one phase from the servo for limiting change of servo output position to one direction only.

The amplifiers and shunting unit of FIG. 1 are shown in greater detail in FIG. 2. The signal from the mixing point 12 is connected to the control element of a triode amplifier tube 23 comprising the amplifier 13. The output of this amplifier is coupled as an input to triode amplifier tubes 24, 25 through a capacitor 26 and a resistor 27. The cathodes of the tubes 24, 25 are connected together while the plates are connected through the respective halves of the secondary winding of a transformer 30 and to the motor 11. An A.C. supply voltage is connected to the primary of the transformer 30. Under normal operation, the direction of rotation of the motor 11 will be a function of the phase of the signal appearing at the grid of the input tube 23. For example, a signal as shown in FIG. 3a will rotate the motor in a direction to drive the recorder upscale while a signal of opposite phase as shown in FIG. 3b will rotate the motor to drive the recorder downscale.

The shunting unit 17 includes a switch 31 having a moving arm connected to the switch 18, a first fixed contact connected to circuit ground through a diode rectifier 32, and a second fixed contact connected to circuit ground through a diode rectifier 33. The switch 31 is actuated in synchronism and in phase with the A.C. signal in the amplifier. Typically, the switch may be a chopper including a driving coil 34 actuated by the A.C. voltage source. A phasing capacitor may be included in the chopper driving circuit when necessary for control of phase relationships. Of course, other types of switching circuits can be used such as the now well-known solid state switching circuits.

The rectifiers 32, 33 are connected in opposing polarity so that a signal of one phase at point 16 will not be affected by the shunting unit, while a signal of the opposite phase will be shunted to circuit ground. FIGS. 3a and 3b illustrate two signals at point 16 when the switch 18 is open. FIGS. 3c and 3d illustrate the signals for corresponding conditions when the switch 18 is closed. Actuation of the switch 31 is phased so that when a positive peak occurs in the upscale driving signal of FIG. 3a, the rectifier 33 is connected in shunt with the point 16 and when a negative peak occurs, the rectifier 32 is connected in shunt. Hence the upscale signal is not affected by the shunting circuit. However, when a downscale signal appears at point 16, point 16 is negative with respect to circuit ground when the rectifier 33 is connected, resulting in a substantially zero voltage at point 16 as shown in FIG. 3d. The resistor 27 functions as a current limiting resistor during the shunting operation. Hence when the switch 18 is closed, the motor 11 will be driven by signals which tend to move the recorder upscale but will not be driven by signals which tend to move the recorder downscale. The switch 18 may be actuated by various means both manual and automatic, and a preferred means is shown in FIG. 1.

The time of occurrence of signal peaks in a chromatograph output is ordinarily known. Hence it is an easy matter to utilize the timer 15 to control the relay 19 for actuating the switch 18 at the desired times. Referring to FIG. 4, the switch 18 may be closed at $t_1$, opened at $t_2$, closed again at $t_3$, opened again at $t_4$, etc. Then the signal peak 40 will cause the recorder to move upscale until a maximum value is reached, after which the recorder will remain at this maximum value indicated at 41 until time $2_2$ when the switch 18 is opened. The conventional return trace of the recorder for the peak 40 with no shunting unit is shown in dashed lines. At time $t_2$, the recorder will be driven to correspond to the then existing output of the chromatograph and will continue to plot the chromatograph output until the switch 18 is closed and a downscale signal is produced, producing another flat-top peak 42, with the flat top of the peak corresponding to the maximum value of the signal peak of the chromatograph output.

Thus it is seen that the shunting unit operated in conjunction with the recorder servo loop provides a circuit for determining the maximum value of signal peaks and holding the recorder or other output device at this maximum value for any desired period.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a signal peak control circuit for operation with a chromatographic analyzer or the like which produces an output in the form of a train of signal peaks, the combination of:

an output servo for actuating a recorder or the like as a function of the analyzer output, including a phase sensitive motor and a motor driving circuit producing an A.C. output signal to said motor varying in phase as a function of the slope of a signal peak;

a switching circuit for connecting an input terminal to circuit ground through alternate unidirectional conducting paths of opposing polarities;

means for driving said switching circuit in phase with the A.C. signal of said motor driving circuit; and means for connecting the A.C. signal of said motor driving circuit to said input terminal of said switching circuit.

2. In a signal peak control circuit for operation with a chromatographic analyzer or the like which produces an output in the form of a train of signal peaks, the combination of:

an output servo for actuating a recorder or the like as a function of the analyzer output, including a phase sensitive motor and a motor driving circuit producing an A.C. output signal to said motor varying in phase as a function of the slope of a signal peak;

a switching circuit for connecting an input terminal to circuit ground through alternate unidirectional conducting paths of opposing polarities;

means for driving said switching circuit in phase with the A.C. signal of said motor driving circuit; and switch means for connecting the A.C. signal of said motor driving circuit to said input terminal of said switching circuit during the period of a signal peak for shunting A.C. signals of one phase corresponding a negative slope of the signal peak.

3. In a signal peak control circuit for operation with a chromatographic analyzer or the like which produces an output in the form of a train of signal peaks, the combination of:

an output servo for actuating a recorder or the like as a function of the analyzer output, including a reversible drive unit moving as a function of the phase of the driving signal connected thereto, and a driving circuit producing a driving signal varying in phase as a function of the slope of a signal peak;

means for connecting an input terminal to circuit ground through alternate unidirectional conducting paths of opposing polarities in phase with the signal of said driving circuit; and means for connecting the signal of said driving circuit to said input terminal for shunting signals of one phase and blocking movement of said drive unit in one direction.

4. In a signal peak control circuit for operation with a chromatographic analyzer or the like which produces an output in the form of a train of signal peaks, the combination of:

an output servo for actuating a recorder or the like as a function of the analyzer output, including a phase sensitive motor and a motor driving circuit producing an A.C. output signal to said motor varying in phase as a function of a slope of a signal peak;

a first switch having an input terminal and a pair of output terminals;

a first rectifier connected between one of said output terminals and circuit ground;

a second rectifier connected between the other of said output terminals and circuit ground with a polarity opposite that of said first rectifier;

means for driving said first switch in phase with the

A.C. signal of said motor driving circuit to alternately connect said input terminal to each of said output terminals; and a second switch for connecting the A.C. signal of said motor driving circuit to said input terminal of said first switch for shunting signals of the phase corresponding to the negative slope of a signal peak.

5. In combination:

a phase sensitive recorder servo for driving a record chart marking device or the like as a function of an input signal coupled thereto, with said input signal including at least one signal peak, said recorder servo including means for generating a feedback signal varying as a function of servo output position and means for combining said feedback and input signals to produce an error signal for said servo varying in phase as a function of the slope of the signal peak; and means for blocking error signals of one phase from the servo output for limiting change of said servo output position to one direction.

References Cited by the Examiner
UNITED STATES PATENTS

| | | | |
|---|---|---|---|
| 2,779,869 | 1/57 | Gerks | 325—67 |
| 2,856,468 | 10/58 | Berry | 324—118 |
| 2,978,622 | 4/61 | Wittke | 318—31 |
| 3,041,535 | 6/62 | Cochran | 324—118 |

FOREIGN PATENTS

| | | |
|---|---|---|
| 591,359 | 1/60 | Canada. |

ORIS L. RADER, *Primary Examiner.*

DAVID C. REDINBAUGH, *Examiner.*